United States Patent [19]

Bly et al.

[11] Patent Number: 4,462,812

[45] Date of Patent: Jul. 31, 1984

[54] CERAMIC MONOLITH PARTICULATE TRAP INCLUDING FILTER SUPPORT

[75] Inventors: Kenneth B. Bly, Pontiac; Terrance L. Stark, Washington; Otto A. Ludecke, Rochester, all of Mich.

[73] Assignee: General Motors Corporation, Detroit, Mich.

[21] Appl. No.: 447,776

[22] Filed: Dec. 8, 1982

[51] Int. Cl.³ .............................................. B01D 39/20

[52] U.S. Cl. .......................................... 55/502; 55/484; 55/DIG. 30; 422/179

[58] Field of Search ................. 55/502, 523, DIG. 30, 55/484; 422/179, 180; 428/116–118; 60/311; 210/510

[56] References Cited

U.S. PATENT DOCUMENTS

| | | | |
|---|---|---|---|
| 3,814,589 | 6/1974 | Heitland | 422/180 |
| 3,912,459 | 10/1975 | Kearsley | 422/179 |
| 3,926,565 | 12/1975 | Birtigh et al. | 422/180 |
| 4,039,294 | 8/1977 | Mayer et al. | 55/DIG. 30 |
| 4,149,862 | 4/1979 | Sewell, Sr. | 55/DIG. 30 |
| 4,269,807 | 5/1981 | Bailey et al. | 422/179 |
| 4,276,071 | 6/1981 | Outland | 55/523 |
| 4,335,078 | 6/1982 | Ushijima et al. | 422/180 |
| 4,352,783 | 10/1982 | Bailey | 55/DIG. 30 |
| 4,386,497 | 6/1983 | Takagi et al. | 55/DIG. 30 |

*Primary Examiner*—David L. Lacey
*Attorney, Agent, or Firm*—Arthur N. Krein

[57] ABSTRACT

A particulate trap for use in the exhaust system of a diesel engine to effect removal of particulates from the exhaust gases discharged from the engine, has a trap housing with an exhaust inlet at one end and an exhaust outlet at its opposite end with at least one ceramic monolith wall flow particulate filter having an inlet end and an outlet end positioned in the trap housing by a tubular support member having a mat of refractory material sandwiched between it and a portion of said particulate filter next adjacent to the outlet end thereof in a manner to prevent bypass flow from said exhaust inlet around said particulate to the exhaust outlet, at least 50% of the exterior surface of the particulate filter next adjacent to its inlet end being in spaced apart relationship to the trap housing so as to define a passage in flow communication with the incoming exhaust gases whereby these gases will heat the exterior of the filter next adjacent to the inlet end thereof so as to effect a reduction of the thermal stress on the particulate filter during engine operation. This support arrangement also reduces radial and axial stress on this exposed end of the filter.

3 Claims, 6 Drawing Figures

CERAMIC MONOLITH PARTICULATE TRAP INCLUDING FILTER SUPPORT

FIELD OF THE INVENTION

This invention relates to particulate traps for use in the exhaust system of diesel engines and, in particular, to the supports for ceramic monolith particulate filters in particulate trap housings.

BACKGROUND OF THE INVENTION

It has been the conventional practice to mount ceramic wall flow monolith particulate filters of the type disclosed, for example, in U.S. Pat. No. 4,276,071, entitled Ceramic Filters for Diesel Exhaust Particulates issued June 30, 1981 to Robert J. Outland, in a manner similar to that normally used for supporting ceramic monolith type catalytic converters or reactors in their respective associate reactor housings.

Thus it has been the usual practice to support a ceramic monolith type catalytic reactor cone element about its outer peripheral surface along its full axial extent whereby it is held immovable and isolated from the inner surfaces of its associate housing in a manner as disclosed, for example, in U.S. Pat. No. 4,335,078, entitled Catalytic Reactor for Automotive Exhaust Line issued June 15, 1982 to Ushijima et al. This type of support arrangement has previously been deemed necessary, since the core element being made of ceramic material was considered fragile and thus it was believed that it required such support along its full length.

The usual arrangement to thus support the core element is by the provision of a cushioning or buffer layer, in the form, for example, of a mat of a suitable refractory type material, being applied about the outer periphery of the core element. As assembled in an associate housing, this material is sandwiched, in a predetermined compressed condition, as desired, between the outer peripheral surface of the core element and the inner peripheral surface of the shell portion of the associate housing. This mat material is suitably compressed or is otherwise formed whereby to effect a seal between the core element and the internal wall of its housing to prevent the bypass flow of exhaust gas.

Thus to date it has been deemed necessary to support a ceramic wall flow monolith particulate filter in its housing in a similar manner by the use of a mat material sandwiched between its outer peripheral surface and the internal surface of the shell portion of its associate particulate trap housing along the full length of the monolith particulate filter.

It has now been discovered that the above-described continuous support arrangement, as applied to a wall flow ceramic monolith particulate filter, has caused two problems to exist, as follows:

(1) Since the ceramic monolith particulate filter will expand and contract at a different rate than the steel housing, then in view of the tightly sealed full axial support of this filter on its whole length within the housing, radial and axial stresses can result in the monolith particulate filter, as during incineration of the particulates collected thereon, which can easily exceed its modules of rupture; and, (2) The tight packing of the buffer layer around the exterior of the monolith particulate filter tends to conduct heat to the housing exterior, so that during the heating and then incineration of the particulates, the temperature within the interior of the filter is increased rapidly whereas the outermost cells thereof do not respond rapidly and, accordingly, thermal gradients will occur which can cause a thermal stress crack in the monolith particulate filter. Of course, if the aspect ratio (length÷diameter) of the ceramic monolith particulate filter is large (>1.0), the mechanical stress created by axial and radial temperature gradients are substantially increased.

SUMMARY OF THE INVENTION

The present invention relates to an arrangement for supporting a ceramic monolith particulate filter within a trap housing whereby the filter is sealed only at its exit end portion so that from 50 to 90% of the exterior of the monolith particulate filter, as measured from its inlet end, is exposed to inlet exhaust gas temperature.

It is therefore a primary object of the invention to provide an improved particulate trap for use in diesel engine exhaust lines, the trap including a housing with a wall flow, ceramic monolith particulate filter mounted therein in a manner whereby only the outlet end portion of the filter is sealed to prevent bypass flow of exhaust gases, while the exterior of the filter, adjacent to its inlet end, is exposed to the incoming flow of exhaust gases so as to reduce the radial temperature gradient across the filter, as during the incineration of particulates trapped thereby.

Another object of the invention is to provide an improved particulate trap for use in the exhaust system of a diesel engine, wherein a ceramic monolith particulate filter is mounted in a trap housing so as to permit heating of 50 to 90% of the exterior of the inlet end portion of the filter by inlet exhaust gases and so as to permit this portion of the filter to be free floating whereby it is free to expand and contract relative to the trap housing.

A still further object of the invention is to provide an improved particulate trap for use in the exhaust system of an internal combustion engine, the trap including a trap housing with an associate ceramic monolith particulate filter mounted therein with a seal sandwiched between the outer surface thereof adjacent to its outlet end and the interior of the trap housing, the opposite end of the filter being free-floating and radially spaced from the trap housing whereby it will be exposed to the flow of incoming exhaust gas discharged from the engine.

For a better understanding of the invention as well as other objects and further features thereof, reference is had to the following detailed description of the invention to be read in connection with the accompanying drawings.

DESCRIPTION OF THE PREFERRED EMBODIMENTS

Figure 1:
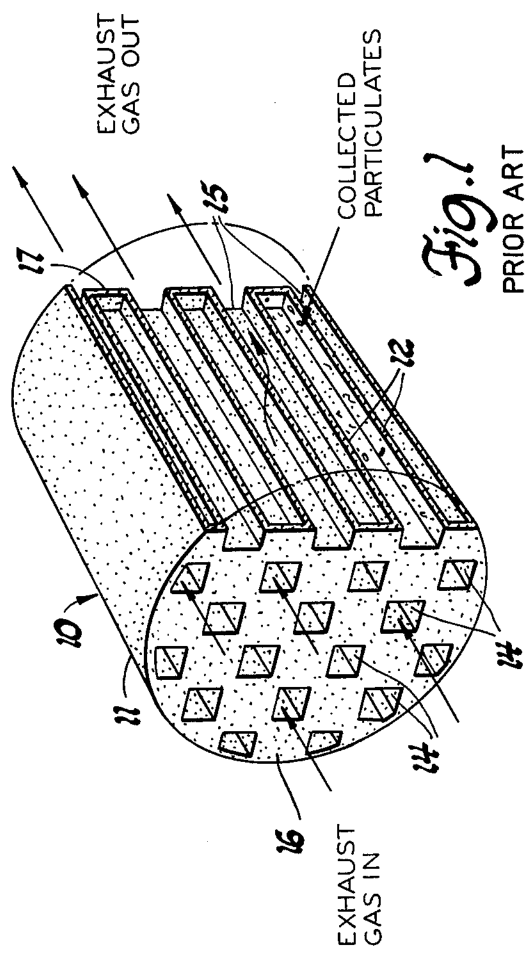
Fig.1 PRIOR ART
FIG. 1 is a sectional pictorial view showing the construction of a conventional wall flow, ceramic monolith particulate filter, the inlet and outlet channels thereof being greatly enlarged for purpose of illustration only.

Referring first to FIG. 1, there is illustrated a conventional wall flow, ceramic monolith particulate filter 10 of the type disclosed in the above-identified U.S. Pat. No. 4,276,071. In the construction shown, the filter 10 has a surrounding cylindrical outer wall 11 internally connected by a large number of interlaced thin porous internal walls 12. The interlaced walls 12 define internally thereof two groups of parallel passages or channels including respectively inlet channels 14 and outlet channels 15, each extending to opposite ends of the filter. The inlet channels 14 are open at the inlet end 16 of the filter and are closed at the outlet end 17 of the filter, while the outlet channels 15 are closed at the filter inlet end 16 and open at the outlet end 17.

In the construction of the filter 10 illustrated, the channels are shown as being of square cross-section although, as disclosed in the above-identified U.S. Pat. No. 4,276,071 numerous other configurations could be utilized. It should also be realized that the channels are shown greatly enlarged for purpose of illustration only, and that in actual practice, these filters are usually made with 100 or more channels or cells per square inch.

The construction of the ceramic monolith is such that the interior walls 12 are porous so as to permit passage of exhaust gases through the walls from the inlet channels 14 to the outlet channels 15. The porosity of these walls is sized appropriately to filter out a substantial portion of the particulates present in diesel exhaust gases as shown in one of the inlet channels 14 in FIG. 1.

Figure 2:
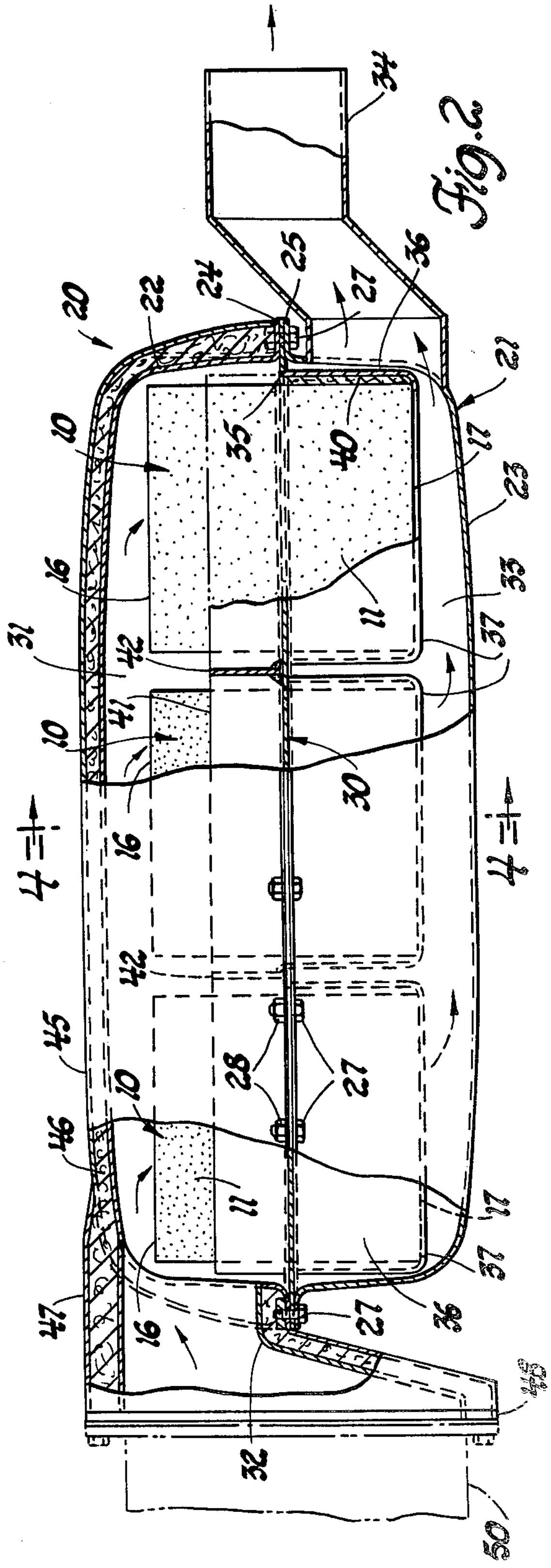
FIG. 2 is a side elevational view of a first embodiment particulate trap that includes a trap housing with plural ceramic monolith particulate filters mounted therein in accordance with the invention, with parts of the trap housing broken away to show interior details of the assembly.
Figure 3:
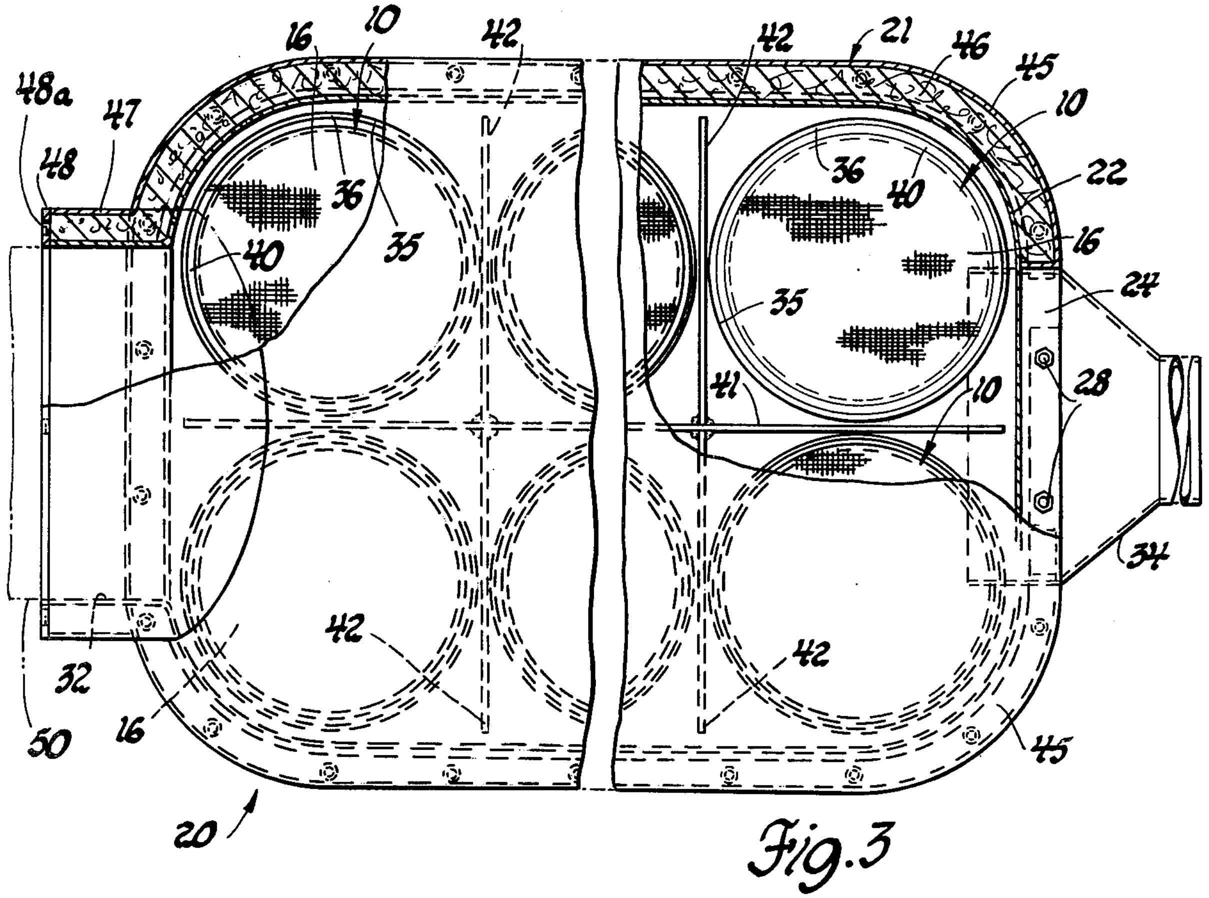
FIG. 3 is a top view of the particulate trap of FIG. 2, with parts thereof broken away to show interior details of the structure.
Figure 4:
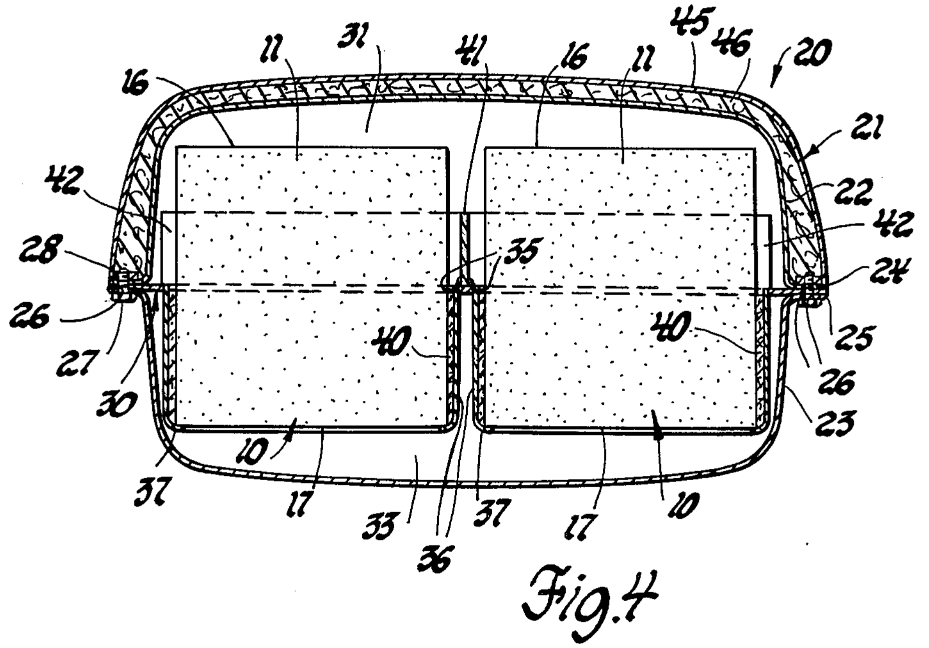
FIG. 4 is a sectional view taken along line 4—4 of FIG. 2.

Referring now to the subject invention there is illustrated in FIGS. 2, 3 and 4 an embodiment of a diesel particulate trap, generally designated 20, having a plurality of monolith particulate filters 10, of the type shown in FIG. 1, mounted and supported in a trap housing in accordance with the invention, for use in the exhaust system of a diesel engine, not shown.

The particulate trap 20 includes a trap housing 21 which, for ease of manufacture and assembly is in the form of a multi-piece housing that includes an upper shell 22 and a lower shell 23. The upper and lower shells 22 and 23, respectively, made of a suitable heat and corrosion resistant material, such as stainless steel, are provided with outwardly extending annular flanges 24, 25, respectively. Both of these flanges 24 and 25 are provided with spaced apart apertures 26 whereby the shells can be secured together with a filter holder plate 30, to be described in detail hereinafter, sandwiched therebetween, as by bolts 27 and nuts 28 into a unitary structure. In the construction shown, the nuts 28 are secured, as by welding, to the flange 24 of the upper shell 22 so as to encircle the apertures 26 therein whereby to facilitate assembly, as will become apparent hereinafter.

The filter holder plate 30 defines with the upper shell 22 an exhaust inlet chamber 31, the upper shell 22 having an exhaust inlet passage 32 formed integral therewith which at one end is adapted to be connected so as to receive exhaust gases discharged from a diesel engine, not shown, and which at its other end is in flow communication with the exhaust inlet chamber 31.

In a similar manner, the filter holder plate 30 defines with the lower shell 23 an exhaust outlet chamber 33. As shown, the lower shell 23 has an exhaust outlet passage 34 formed integral therewith which at one end is in flow communication with the outlet chamber 33 and which at its other end is adapted to be connected to a conventional exhaust tail pipe, not shown.

As illustrated, the outer peripheral edge portion of the filter holder plate 30 is also provided with spaced apart apertures 26 aligned with the associated apertures 26 in the flanges 24 and 25. In addition, the filter holder plate 30 is provided with a plurality of spaced apart openings 35 located inboard of the apertures 26 therein. The openings 35 are of a size and configuration so as to slidably receive the particulate filters associated therewith and, thus in the embodiment shown, the openings are of circular configuration, with six such openings being used in the construction illustrated in FIGS. 2–4.

Accordingly, in the construction illustrated six tubular filter supports 36 are suitably secured at one end as by welding, to the filter holder plate 30, with each such filter support 36 positioned so as to encircle an associate opening 35 and to depend downward, with reference to FIGS. 2 and 4, into the exhaust outlet chamber 33.

Each filter support 36, at its free end, the lower end with reference to FIGS. 2 and 4, is provided with a radially inward extending annular flange 37 to define an abutment shoulder for engagement with a portion of the outlet end 17 face of an associate particulate filter 10 next adjacent to the outer peripheral surface thereof.

Each filter support 36, in the construction shown, is of an internal diameter that is a predetermined amount greater than the outside diameter of the particulate filter 10 associated therewith, while its annular flange 37 has a minimum internal diameter that is a predetermined amount less than the outside diameter of the filter associated therewith.

As best seen in FIG. 4, each particulate filter 10 is slidably received through an opening 35 in the filter holder plate 30 with its outlet end 17 portion extending into an associate filter support 36 so that its outlet end 17 adjacent to its outer peripheral edge is supported by the flange 37 of the filter support 36. As shown in this Figure, a compressible mat 40, of a suitable refractory material, is sandwiched between the outer peripheral surface of the filter 10 and the internal wall surface of the filter support 36.

In the particular construction shown, each filter 10 was assembled to its associate filter support 36 by first wrapping the mat 40 material around the lower outlet end 17 portion of the filter 10. Thereafter, this subassembly of filter 10 and mat 40 was placed into a suitable thin-walled assembly mandrel, not shown, having an inwardly tapered cylindrical internal wall. The assembly mandrel, with the filter 10 and wrapped around mat 40 therein, is then positioned over an opening 35 in the filter holder plate 30. Thereafter, the filter 10 and associate mat 40 are pressed down through the assembly mandrel into the filter support 36 until the outlet end 17 face portion of the filter 10 is in abutment with the flange 37 of that support.

As the filter 10 and associate mat 40 are pressed down through the assembly mandrel, the mat 40 will be sufficiently compressed radially inward by engagement with the internal tapered wall of the assembly mandrel, not shown, so that it and the filter 10 will be received in the filter support 36, with the mat 40 then being positioned so as to support the filter 10 within the filter support 36 and to affect a seal between the filter and its support to prevent the bypass flow of exhaust gases around the filter 10.

Since the embodiment of the particulate trap housing 21 shown in FIGS. 2, 3 and 4, is adapted to support six particulate filters 10 therein, the aspect ratio (length÷diameter) of these ceramic monolith particulate filter 10 were made, in a particular application, to be approximately equal to 1.0, that is, the axial extent of each filter 10 is approximately equal to its outside diameter in this application.

In the construction shown in FIGS. 2–4, the axial extent of each filter support 36 is approximately equal to one-half of the axial extent of the associate filter 10. Accordingly, in the construction illustrated, approximately 50% of the inlet end 16 portion of each filter 10 is positioned so as to loosely extend into the exhaust inlet chamber 31 whereby exhaust gas flowing into this chamber can flow around the exposed outer peripheral surface of the filters. Accordingly, these exposed inlet end 16 portions of the filters, by being in heat exchange relationship with the incoming exhaust gases, will be maintained at a temperature corresponding substantially to the temperature of the incoming exhaust gases.

Although in the construction shown, the filter supports 36 are of an axial extent so as to support approximately 50% of the outlet end 17 portion of each filter, it will be apparent to those skilled in the art that the axial extent of the filter supports 36 can be preselected so that, for example, as little as 10% of the outlet end 17 portion of the filter 10 is supported and sealed in the manner described hereinabove. Thus, depending on the preselected axial extent of the filter supports 36, the filters 10 can be mounted so that preferably at least 50% and up to approximately 90% of the exterior thereof extending from its inlet end will be exposed to the incoming flow of exhaust gases so as to be heated thereby.

In the construction illustrated, suitable stiffener plates 41 and 42 are suitably secured at one edge, as by welding, to the upper surface of the filter holder plate 30 so as to extend upward therefrom. As shown in FIG. 3, these stiffener plates are arranged in a grid-like pattern, whereby to reinforce and stiffen the holder plate 30 against flexing due to the weight of the filters 10 and due to the differential pressure that can prevail on opposite sides of the holder plate 30 during operation.

As should now be apparent, the filter holder plate 30, filter supports 36 and the stiffener plates 41, 42, like other structural elements of the trap housing, are also preferably made of a suitable heat and corrosion resistant material, such as stainless steel.

Although the filter supports 36 are shown as being of closed ring-like configuration and thus requiring the use of an assembly mandrel as described hereinabove, it will be apparent to those skilled in the art, that, if desired, each filter support could be in the form of a split ring with a suitable clamp arrangement integral therewith to effect sealed engagement of the mat between the filter and filter support or, alternatively, the filter support could be of split ring configuration with a clamp, similar to a hose clamp, used to encircle the support during assembly and compression of the mat 40 around the filter, as desired, prior to welding together of the split seam edges of the support, after which the clamp could be removed.

Preferably, as shown in FIGS. 2–4, the particulate trap 20 also includes an outer shell 45 of a suitable complementary configuration relative to the upper shell 22 which is positioned so as to overlie the upper shell 22 in spaced apart relationship to the main body portion thereof with a suitable, commercially available, high temperature thermal insulation material 46 loosely sandwiched therebetween. As illustrated, the outer shell 45 includes an outer inlet shell portion 47 that loosely encircles the exhaust inlet passage 32 with similar thermal insulation material 46 also loosely sandwiched therebetween.

As best seen in FIGS. 2–4, the outer edge portions of the outer shell 45 are secured, as by welding, to the outer peripheral edge of the flange 24 of the upper shell 22, while the front edges of both the exhaust inlet passage 32 and of the inlet shell portion 47 are suitably secured, as by welding, to an apertured inlet ring flange 48, which in effect forms part of the inlet passage 32. Ring flange 48, is provided, for example, with circumferentially spaced apart, internally threaded, screw receiving apertures 48*a* whereby it can be secured into the exhaust system of the engine, in a known manner.

In operation, exhaust gases discharged from an associate diesel engine, not shown, can flow via the exhaust inlet passage 32 into the inlet chamber 31. These exhaust gases in the inlet chamber 31 can then flow freely around the outer peripheral surface of the filters 10 adjacent to their inlet end 16 portion and also into the inlet channels 14 of these filters, for flow through the porous walls 12 and discharge via the outlet channels 15 into the exhaust outlet chamber 33. From the outlet chamber 33 the now cleaned exhaust gases can then be discharged out through the exhaust outlet passage 34 as to the atmosphere.

As well known in the art, a substantial portion of the particulates in the exhaust gas discharged from the engine will be filtered out of the exhaust gas and collect on the porous walls 12 of the filter. Accordingly, the particulates trapped by a filter 10 must be periodically cleaned off as by incineration of these particulates.

As is known, incineration of the particulates can be initiated by providing a suitable source of heat, such as by the use of an electrical heater means or by the use of a fuel burner assembly which normally includes an air/fuel nozzle and an igniter, that can be mounted in or operatively associated with, for example, a duct 50, suitably connected between the exhaust inlet passage 32, as shown in FIG. 2, and the exhaust manifold, not shown, of an engine. Alternatively, intake throttling can be used, as known in the art, to effect incineration of the particulates or, if desired, a suitable catalyst material can be coated on the filter or added to the diesel fuel used in the engine to effect incineration of the particulates. Suitable catalyst materials which can be used as an fuel additive are, for example, copper naphthalene, copper acetate, tetraethyl lead and methycyclopentadienyl manganese tricarbonyl which will reduce the ignition temperature of diesel particulates from about 600° C. to about 420° C.

Figure 5:
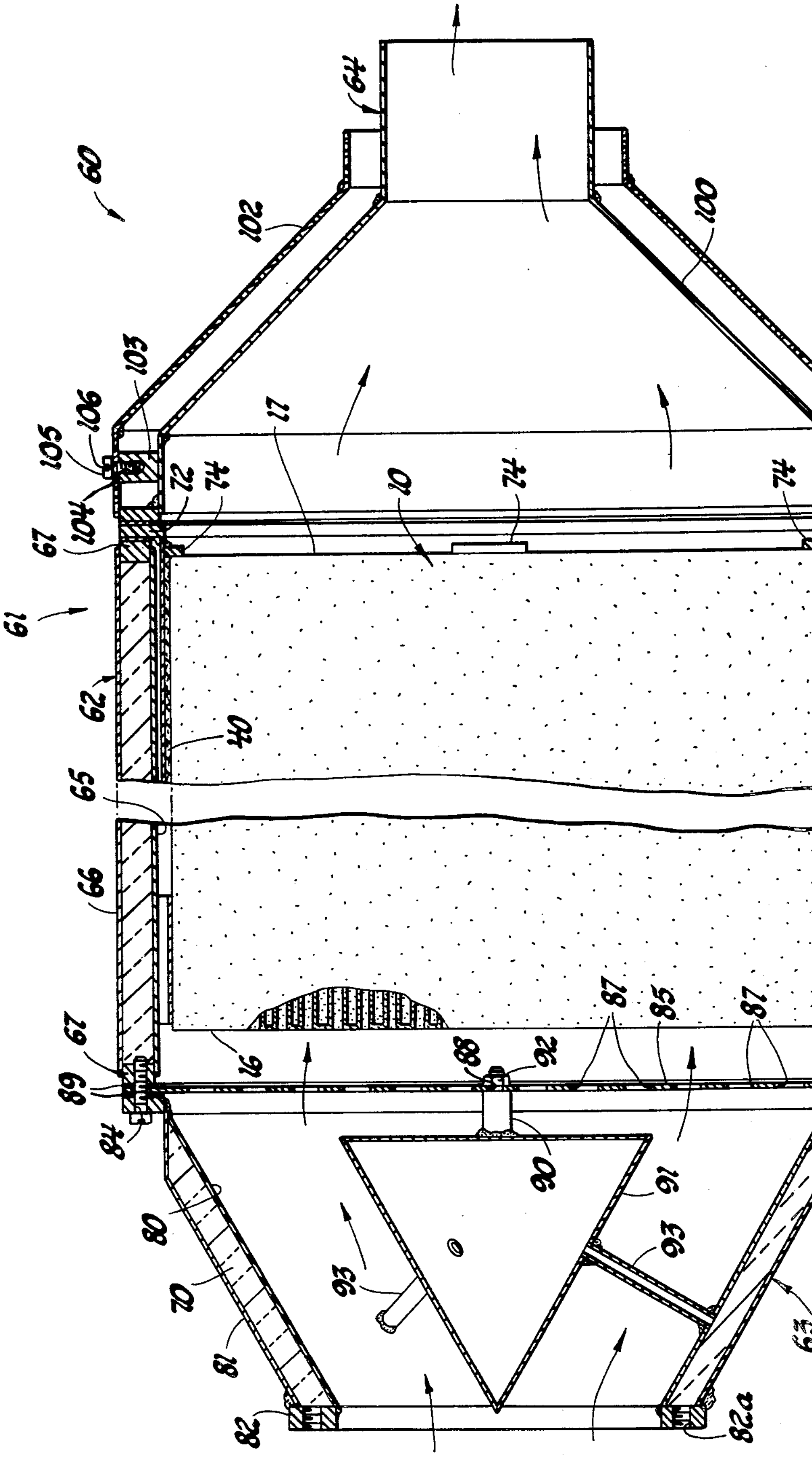
FIG. 5 is a sectional view in elevation of an alternate embodiment particulate trap having a ceramic monolith particulate mounted in a trap housing in accordance with the invention; and, FIG. 6 is an inlet end view of a further alternate embodiment of a particulate trap similar to that of FIG. 5, but with a secondary filter support at the inlet end portion of the filter.
Figure 6:
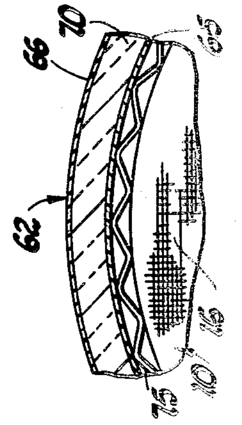

An alternate embodiment of particulate trap, generally designated 60, having a single ceramic monolith particulate trap 10 mounted therein in accordance with the invention is shown in FIGS. 5 and 6.

The particulate trap 60, in this embodiment, is provided with a tubular trap housing 61 that includes a tubular filter housing 62 having an exhaust inlet 63 at one end and an exhaust outlet 64 at its opposite end.

In the construction shown, the filter housing 62 includes a circular inner shell 65 and an outer shell 66 loosely encircling the inner shell 65, with these shells suitably fixed, as by welding, at their opposite ends to a pair of annular, ring-like flanges 67, each such flange being provided with circumferentially spaced apart internally threaded apertures 68. As best seen in FIG. 5, a suitable, high temperature resistant, thermal insulating material 70 is loosely sandwiched between the inner and outer shells 65 and 66, respectively, along their axial extent between the flanges 67.

A ceramic monolith particulate filter 10 is mounted within the inner shell 65 of the filter housing 62 by having its outlet end 17 portion supported within a filter support cylinder 71 that, in turn, has one end thereof suitably secured, as by welding, to a ring flange 72 adapted to be secured to a flange 67 at the discharge end of the filter housing 62, the right hand end with reference to FIG. 5. For this purpose, the ring flange 72 is provided with circumferentially spaced apart apertures 73 aligned with corresponding threaded apertures 68 in the associate flange 67.

As shown in FIG. 5, the outside diameter of the support cylinder 71 is less than the inside diameter of the inner shell 65 by a predetermined amount whereby it can be mounted substantially concentrically within the inner shell 65 out of contact therewith. Also, as shown, the inside diameter of the support cylinder 71 is greater than the outside diameter of the associate particulate filter 10 by a predetermined amount, as desired.

The ceramic monolith particulate filter 10 is concentrically supported at its outlet end 17 portion within the support cylinder 71 by means of a refractory mat 40 wrapped around the outer peripheral surface of this end portion of the filter 10 and compressibly sandwiched between this surface and the interior surface of the support cylinder 71.

The particulate filter 10 is also retained against axial movement in one direction as by means of radial inward extending stops 74 suitably secured, as by welding, to the interior surface of the support cylinder 71, in axial spaced apart relationship to the ring flange 72 and in circumferentially spaced apart relationship to each other, in the construction illustrated.

In a particular application, the above assembly was fabricated using a split support cylinder 71. After wrapping of the mat 40 around the particulate filter 10, this sub-assembly was inserted into the split support cylinder 71 with the outlet end 17 face of the filter 10 in abutment against the stops 74. A clamp, not shown, similar to a hose clamp and of suitable diameter, was positioned so as to encircle the split support cylinder and then drawn up so as to effect compression of the mat 40 and to draw the split edges of the split support cylinder 71 into abutment against each other, after which these edges were welded together to form a circumferentially enclosed support cylinder. After removal of the clamp, the free end of the support cylinder 71 was then welded to the ring flange 72, as shown in FIG. 5.

It should now be appreciated that the ceramic monolith particulate filter 10 is supported at its outlet end 17 portion by the mat 40 and support cylinder 71 in cantilever fashion within the inner shell 65. With this arrangement, the inlet end 16 portion of the particulate filter 10 can be free floating with its outer peripheral surface then defining with the internal wall of the inner shell 65 an annular passage in flow communication with the incoming exhaust gases discharged from an associate engine.

The axial extent of the support cylinder 71 and mat 40 can be preselected so that, for example, preferably 50% and up to approximately 90% of the outer peripheral surface of the particulate filter 10 can be placed in heat exchange relationship to the incoming flow of exhaust gases. Stated in a different manner, only approximately 10% to 50% of the particulate filter 10 in terms of its axial length need be supported and sealed by the mat 40 and support cylinder 71.

Referring now to the exhaust inlet 63, in the construction shown this exhaust inlet includes an inner exhaust transition inlet passage 80 loosely encircled intermediate its ends by an outer shell 81 with the thermal insulating material 70 loosely sandwiched therebetween. At its reduced diameter inlet end, the left hand end with reference to FIG. 5, the inlet passage 80 and outer shell 81 are secured by welding to a ring mounting flange 82 having circumferentially spaced apart internally threaded apertures **82*a* therethrough, whereby it can be secured as to the exhaust system of a diesel engine, not shown. At the opposite enlarged diameter end, the inlet passage 80 and outer shell 81 are welded together and to a ring flange 83 having spaced apart bolt receiving apertures 84** therethrough.

Exhaust inlet 63 is secured to the inlet end of the filter housing 62, with an apertured diffuser screen plate 85 sandwiched therebetween, by means of screws 86 which extend through the apertures 84 in the ring flange 83 and corresponding apertures in the diffuser plate 85 into threaded engagement with the internally threaded apertures 68 of the associate flange 67. Suitable ring gaskets 89 are sandwiched between ring flange 83 and the diffuser screen plate 85 and between the latter and the associate flange 67.

As illustrated in FIG. 5, the diffuser screen plate 85 is provided with concentric rows of spaced apart apertures 87 and, with a central opening 88 that is provided so as to receive the threaded reduced diameter end of a base post 90 that is secured, as by welding, so as to extend outward from the base of a hollow, cylindrical pyramid shaped diffuser 91. As shown, a nut 92 is used to secure the base post 90 to the diffuser screen plate 85.

The diffuser 91 is centrally positioned in the exhaust inlet passage 80 and is further supported therein by means of spaced apart struts 93, only two being shown in FIG. 5, that are secured at opposite ends, as by welding, to these elements.

The exhaust outlet 64 includes an exhaust discharge duct 100 having its enlarged diameter end secured, by welding, to a ring flange 101 provided with spaced apart apertures 107 therethrough. The exhaust outlet 64 is secured to the outlet end of the filter housing 62, with the flange 72 of the support cylinder 71 sandwiched therebetween, by means of screws 86. Suitable ring gaskets 89 are positioned between adjacent elements.

Preferably, as shown in the embodiment illustrated in FIG. 5, a perforated annular weed and grass shield 102 is positioned to encircle the exhaust discharge duct 100 in radial spaced apart relationship thereto. In the construction shown, a number of spacer supports 103 are secured, as by welding, at one end to the exterior of the enlarged diameter end of the exhaust duct 100 in circumferentially spaced apart relationship to each other and axial spaced outward from the flange 101. Only one such spacer support is shown in FIG. 5.

At its free end, each spacer support 103 is provided with an internally threaded blind bore 104 that is adapted to threadingly receive a screw 105 extending through an associate aperture 106 provided in the shield 102 whereby the shield can be detachably secured to the exhaust duct 100.

It will be appreciated that if the aspect ratio (length÷diameter) of the ceramic monolith particulate filter 10 is substantially greater than 1.0 and if, for example, less than approximately 50% of its outlet end 17 portion is to be supported in the manner described hereinabove, then it may be desirable to provide an unsealed secondary support for the inlet end 16 portion of the filter 10 in a suitable manner whereby incoming exhaust gases can still flow around this inlet end 16 portion of the filter.

Thus for example, there is shown in FIG. 6 a modification of the particulate trap embodiment of FIG. 5 wherein the inlet end 16 portion of filter 10 is supported by a secondary support element 75, that is illustrated as being in the form of relatively flexible corrugated band made, for example, of thin sheet stainless steel, and which is located so as to encircle the outer peripheral surface of the filter 10 between it and the interior surface of the inner shell 65 whereby the filter 10 is also supported next adjacent to the inlet end 16 face thereof. As shown in FIG. 6, the corrugated band secondary support element 75 makes minimal contact with both the filter 10 and inner shell 65, while providing axial extending passage for the substantially unrestricted flow of exhaust gas around the exterior of the filter. This secondary support element 75, can be of any suitable axial extending extent, as desired, for its intended function.

As should now be apparent to those skilled in the art, other materials, such as an open metal mesh material, not shown, may be used as a secondary support element on this inlet end 16 portion of the filter 10, it only being necessary that such support at the inlet end 16 portion will provide the necessary secondary support for the filter while still permitting the incoming exhaust gases to freely circulate around the outside surface of the filter 10 next adjacent to its inlet end 16.

In the operation of the particulate trap 60 embodiment of FIG. 5 or of the modification thereof shown in FIG. 6, exhaust gases discharged from a diesel engine, not shown, can flow via inlet passage 80 into the inlet end of the filter housing 62 and around the exterior exposed inlet end 16 portion of the filter 10 so as to be in thermal heating contact therewith with the exhaust gases also flowing through the filter 10 in the manner previously described hereinabove. Exhaust bypass flow around the filter 10 is prevented by means of the mat 40 in sealing engagement with the filter 10 and support cylinder 71 and, of course, bypass flow past the support cylinder 71 is prevented by its associate ring flange 72 which serves, in effect, as a radial seal between the support cylinder 71 and the inner shell 65.

It should now be apparent that, with the filter support structures shown whereby at least 50% up to approximately 90% of a filter 10, is, in effect, free standing and exposed to incoming exhaust gases, radial and axial stresses on the filter will be substantially reduced and that the thermal gradients across this end of the filter will also be substantially reduced.

While the invention has been described with reference to the particular embodiments disclosed herein, it is not confined to the details set forth since it is apparent that various modifications can be made by those skilled in the art without departing from the scope of the invention. For example, although the particulate filter support structures have all been illustrated as being for use with filters having circular exterior configurations, it will be apparent that these support structures can readily be modified to support other filter configurations. This application is therefore intended to cover such modifications or changes as may come within the purpose of the invention as defined by the following claims.

The embodiments of the invention in which an exclusive property or privilege is claimed are defined as follows:

1. A particulate trap for use in the exhaust system of a diesel engine to effect removal of particulates from the exhaust gases discharged from the engine, said particulate trap including a trap housing means having wall means defining a chamber with an exhaust inlet means at one end and an exhaust outlet at its opposite end; at least one ceramic monolith wall flow particulate filter having an inlet end and an outlet end in said chamber of said trap housing means; and, a support means, including a cylindrical support and a mat of refractory materials, operatively positioned around a portion of said at least one particulate filter next adjacent to said outlet end and positioned and arranged with respect to said wall means so as to effect support of said at least one particulate filter within said trap housing means in a manner to prevent bypass flow from said exhaust inlet means around said at least one particulate filter to said exhaust outlet, at least 50% of the exterior surface of said at least one particulate filter next adjacent to its inlet end being in spaced apart relationship to said wall means so as to define a passage means in flow communication with said exhaust inlet means whereby incoming exhaust gases can flow around the exposed portion of said at least one particulate filter to heat the exterior thereof next adjacent to said inlet end so as to effect a reduction of the thermal stress on said at least one particulate filter during engine operation.

2. A particulate trap for use in the exhaust system of a diesel engine to effect removal of particulates from the exhaust gases discharged from the engine, said particulate trap including a trap housing means having wall means defining a chamber, a filter support plate means operatively associated with said trap housing means to divide said chamber into an inlet chamber on one side of said support plate means and an outlet chamber on the opposite side of said support plate means, said trap housing means including an exhaust inlet means in flow communication with said inlet chamber and an exhaust outlet in communication with said outlet chamber; at least one ceramic monolith wall flow particulate filter having an inlet end and an outlet end supported by said filter support plate means within said trap housing means; said filter support plate means including a mat of refractory material, operatively positioned around a portion of said at least one particulate filter next adjacent to said outlet end and positioned and arranged with respect to said filter support plate means so as to effect support of said at least one particulate filter within said trap housing means in a manner to prevent bypass flow from said inlet chamber around said at least one particulate filter to said outlet chamber, at least 50% of the exterior surface of said at least one particulate filter next adjacent to its inlet end being in spaced apart relationship to said trap housing means and extending into said inlet chamber whereby incoming exhaust gases can flow around the exposed portion of said at least one particulate filter to heat the exterior thereof next adjacent to said inlet end.

3. A particulate trap for use in the exhaust system of a diesel engine to effect removal of particulates from the exhaust gases discharged from the engine, said particulate trap including a trap housing means having wall means defining a chamber with an exhaust inlet means at one end and an exhaust outlet at its opposite end; a filter support means concentrially mounted in said trap housing means next adjacent to said exhaust outlet, a ceramic monolith wall flow particulate filter having an inlet end and an outlet end supported in said trap housing means by said filter support means; said filter support means including a mat of refractory material, operatively positioned around a portion of said particulate filter next adjacent to said outlet end so as to effect support of said particulate filter by said filter support means within said trap housing means in a manner to prevent bypass flow from said exhaust inlet means around said particulate filter to said exhaust outlet, at least 50% up to approximately 90% of the exterior surface of said particulate filter next adjacent to its inlet end being in spaced apart relationship to said wall means so as to define a passage means in flow communication with said exhaust inlet means whereby incoming exhaust gases can flow around the exposed portion of said particulate filter so as to effect a reduction of the thermal stress on said particulate filter during engine operation.

* * * * *